Feb. 27, 1962   R. B. FRANCISCUS   3,023,027
BICYCLE BUMPERS AND LICENSE PLATE HOLDER
Filed April 7, 1959
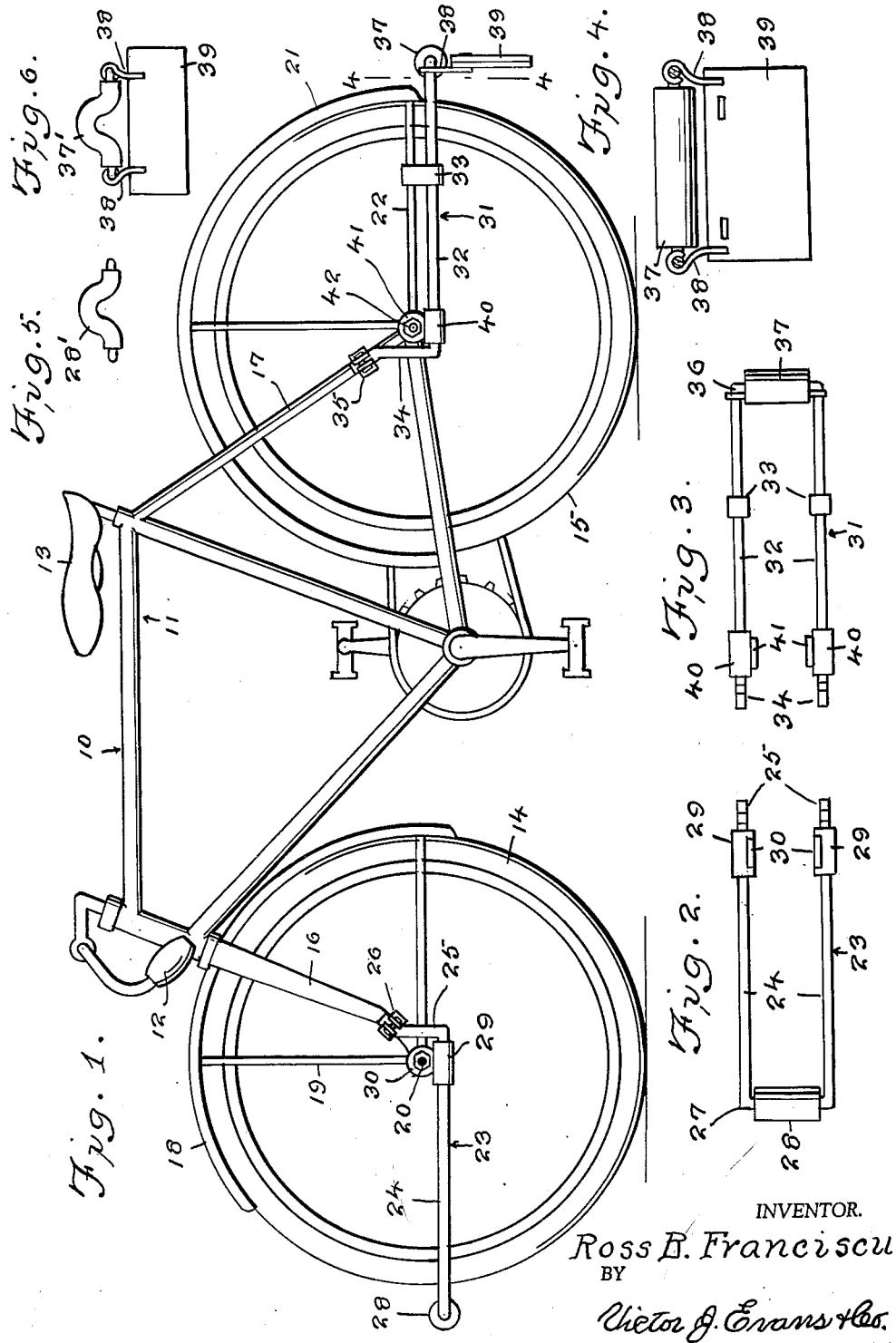
INVENTOR.
Ross B. Franciscus
BY
Victor J. Evans & Co.
ATTORNEYS

United States Patent Office 3,023,027
Patented Feb. 27, 1962

3,023,027
BICYCLE BUMPERS AND LICENSE
PLATE HOLDER
Ross B. Franciscus, 284 Brookwood Ave., Hamilton, Ohio
Filed Apr. 7, 1959, Ser. No. 804,711
2 Claims. (Cl. 280—289)

This invention relates to a two wheel vehicle such as a bicycle, and more particularly to bumper assemblies and a license plate holder for such a vehicle.

The object of the invention is to provide bumper assemblies for a bicycle so that damage to the various parts of the bicycle will be minimized or prevented, and wherein according to the present invention a means is provided for suspending a license plate at the rear of the bicycle.

Another object of the invention is to provide bicycle bumpers and a license plate holder which will add to the appearance of the bicycle and which can be easily installed or removed, and wherein a bicycle equipped with the bumpers of the present invention will be protected from breakage of parts or damage thereto.

A further object of the invention is to provide a bicycle bumper assembly and license plate holder which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is a side elevational view of a bicycle equipped with the bumpers and license plate holder of the present invention.

FIGURE 2 is a plan view of the front bumper assembly.

FIGURE 3 is a plan view of the rear bumper assembly.

FIGURE 4 is a section view taken on the line 4—4 of FIGURE 3.

FIGURE 5 is an elevational view showing a modification of the front bumper.

FIGURE 6 is an elevational view illustrating a modification of the rear bumper.

Referring in detail the the drawings, the numeral 10 indicates a conventional bicycle which includes a frame 11, and there is provided the usual handle bars 12 and seat 13 as well as a front wheel 14 and a rear wheel 15. The frame 11 includes the front fork 16 and the rear fork 17, and contiguous to the front wheel 14 is a front fender 18, and braces 19 are connected to the fender 18. The numeral 20 indicates the front axle for the wheel 14.

There is further provided contiguous to the rear wheel 15 a rear fender 21 which has braces 22 affixed thereto.

The numeral 23 indicates the front bumper assembly which includes a pair of spaced parallel arms 24 that have their front ends connected together by means of the crosspiece 27. There is provided on the rear ends of the arms 24 vertically disposed end portions 25 which are clamped to the front fork 16 as at 26. A cylindrical bumper 28 is mounted on the crosspiece 27. Instead of using a cylindrical bumper 28 as shown in FIGURE 2, a modified bumper 28' may be used as shown in FIGURE 5, and the bumper 28' includes an intermediate offset portion.

Mounted on each arm 24 is a bushing 29, and a support piece 30 is secured to or formed integral with each bushing 29, the support piece 30 having an axle such as the axle 20 extending therethrough.

There is further provided a rear bumper assembly which is indicated generally by the numeral 31, and the rear bumper assembly 31 includes a pair of spaced parallel arms 32 which are adapted to be fastened to the braces 22, as for example by means of clamps 33. Arranged on the front end of each arm 32 is a vertically disposed end portion 34 which is adapted to be fastened to the rear fork 17 by means of clamps 35.

Extending between the rear ends of the arms 32 and secured thereto or formed integral therewith is a crosspiece 36 which supports a bumper such as the cylindrical bumper 37. However, a modified bumper 37' as shown in FIGURE 6 may be used, and wherein the bumper 37' includes an intermediate offset portion instead of being cylindrical.

The numeral 38 indicates legs which depend from the arms 32, and the legs 38 are connected to a license plate holder 39.

Bushings 40 which are similar to the bushings 29, are mounted on the rear arms 32, and these bushings 40 are provided with support pieces 41 through which extends the rear axle 42.

From the foregoing, it is apparent that there has been provided bumper assemblies and a license plate holder for use with a bicycle such as the bicycle 10. The present invention is also applicable to other types of vehicles such as motorcycles.

In use, the front bumper assembly 23 is adapted to be fastened in place by means of the clamps 26 and can be connected to the front fork 16, and the bushings 29 on the arms 24 have apertured support pieces 30 extending therefrom whereby the front axle 20 can extend through these pieces 30. The front bumper 28 or 28' will help prevent damage to various parts of the bicycle such as damage to the front wheel 14 or other members on the bicycle in the event that the bicycle encounters an obstruction, obstacle or the like.

The rear bumper assembly 31 is fastened to the rear fork 17 by means of the clamps 35, and the clamps 33 fasten the arms 32 to the braces 22. The bushings 40 on the arms 32 have the support pieces 41 through which extends the rear axle 42, and there is provided the rear bumper 37 which is cylindrical, or else an offset bumper 37' as shown in FIGURE 6 may be used. The legs 38 depend from the bumper assembly 31 and the legs 38 serve to support a license plate holder 39.

Thus, not only will the bumper assemblies of the present invention help insure that the bicycle can be driven or operated in a more safe manner, but also the bumper assemblies will help insure that breakage or damage to the parts will be prevented or minimized. In addition, the provision of the bumper assemblies and the license plate holder will add to the appearance or enhance the attractiveness of the device.

The parts can be made of any suitable material and in different shapes or sizes.

The bumpers can be adjusted for height by moving the clamps, and as stated previously, the bumpers may have a curved formation or else they may be cylindrical.

The parts are readily assembled and can be easily attached to or detached from the bicycle and the bumpers may be made of a suitable resilient material such as rubber.

Some of the advantages of the present invention are as follows. The bicycle will be given greater protection from broken spokes, damaged fenders or the like, and also a convenient and noticeable location for the license plates are provided and the appearance of the bicycle will be improved. The parts can be made low in cost and can be easily installed and can be made for all sizes of bicycles.

In actual practice, the parallel arms 24 are of one piece construction and are adapted to be made from a suitable material such as steel rod which is formed in a U-shape so as to define the portion 27 which extends therebetween, and the member 28 may be made of a piece of rubber hose which is assembled prior to the forming operation. The same holds true for the rear bumper assembly.

Minor changes in shape, size and rearrangement of details coming within the field of invention claimed may be resorted to in actual practice, if desired.

I claim:

1. In a bicycle of the type including a frame embodying a front fork and a rear fork, a front wheel and a rear wheel and horizontally disposed rear fender braces; the improvement consisting in providing a front bumper assembly embodying a pair of spaced parallel arms arranged on opposite sides of said front wheel, a crosspiece extending between the front ends of said arms, a cylindrical shaped bumper member on said crosspiece, said arms embodying main straight portions and vertically disposed, rearwardly extending end portions which are clamped to said front fork, a bushing mounted on each arm, a support piece on each bushing, a front axle connected to said support pieces, a rear bumper assembly embodying spaced parallel arms and vertically disposed, forwardly extending, end portions which are clamped to the rear fork, said last named arms being in spaced parallel relation to said rear fender braces, clamps connecting said last named arms to the adjacent rear fender braces, a crosspiece extending between the rear ends of the last named arms, a bumper member on said last named crosspiece, and a license plate holder connected to the rear bumper assembly.

2. In a bicycle of the type including a frame embodying a front fork and a rear fork, a front wheel and a rear wheel and horizontally disposed rear fender braces; the improvement consisting in providing a front bumper assembly embodying a pair of spaced parallel arms arranged on opposite sides of said front wheel, a crosspiece extending between the front ends of said arms, a cylindrical shaped bumper member on said crosspiece, said arms embodying main straight portions and vertically disposed, rearwardly extending, end portions which are clamped to said front fork, a bushing mounted on each arm, a support piece on each bushing, a front axle connected to said support pieces, a rear bumper assembly embodying spaced parallel arms and vertically disposed, forwardly extending, end portions which are clamped to the rear fork, said last named arms being in spaced parallel relation to said rear fender braces, clamps connecting said last named arms to the adjacent rear fender braces, a crosspiece extending between the rear ends of the last named arms, a bumper member on said last named crosspiece, and a license plate holder connected to the rear bumper assembly, said license plate holder embodying a supporting member, and legs depending from and connected to the arms of the rear bumper assembly, and said legs being connected to said license plate supporting member.

References Cited in the file of this patent

UNITED STATES PATENTS

| | | |
|---|---|---|
| 853,115 | Reuss | May 7, 1907 |
| 928,416 | Abrahamson | July 20, 1909 |
| 2,011,004 | Love | Aug. 13, 1935 |
| 2,330,684 | Colling | Sept. 28, 1943 |
| 2,558,880 | Sartain | July 3, 1951 |

FOREIGN PATENTS

| | | |
|---|---|---|
| 870,608 | France | Dec. 22, 1941 |